US008065532B2

(12) United States Patent
Shu et al.

(10) Patent No.: US 8,065,532 B2
(45) Date of Patent: Nov. 22, 2011

(54) CRYPTOGRAPHIC ARCHITECTURE WITH RANDOM INSTRUCTION MASKING TO THWART DIFFERENTIAL POWER ANALYSIS

(75) Inventors: David B. Shu, West Hills, CA (US); Lap-Wai Chow, South Pasadena, CA (US); William M. Clark, Jr., Camarillo, CA (US)

(73) Assignee: HRL Laboratories, LLC, Malibu, CA (US)

( * ) Notice: Subject to any disclaimer, the term of this patent is extended or adjusted under 35 U.S.C. 154(b) by 2070 days.

(21) Appl. No.: 10/864,569

(22) Filed: Jun. 8, 2004

(65) Prior Publication Data
US 2005/0271202 A1 Dec. 8, 2005

(51) Int. Cl.
*G06F 11/30* (2006.01)
*G06F 12/14* (2006.01)
(52) U.S. Cl. .................. 713/190; 713/194; 726/22
(58) Field of Classification Search .................. 713/190; 726/22
See application file for complete search history.

(56) References Cited

U.S. PATENT DOCUMENTS

| | | | |
|---|---|---|---|
| 5,560,000 A | 9/1996 | Vogley | |
| 5,866,933 A | 2/1999 | Baukus et al. | 257/368 |
| 5,944,833 A * | 8/1999 | Ugon | 713/400 |
| 6,060,908 A | 5/2000 | Heyne et al. | 326/93 |
| 6,076,161 A * | 6/2000 | Ho | 713/2 |
| 6,208,135 B1 | 3/2001 | Shattil | 324/225 |
| 6,294,816 B1 | 9/2001 | Baukus et al. | 257/368 |
| 6,295,606 B1 | 9/2001 | Messerges et al. | 713/189 |
| 6,298,135 B1 | 10/2001 | Messerges et al. | 380/1 |
| 6,298,153 B1 | 10/2001 | Oishi | 382/186 |
| 6,299,069 B1 | 10/2001 | Shona | 235/492 |
| 6,317,820 B1 | 11/2001 | Shiell et al. | |
| 6,408,075 B1 | 6/2002 | Ohki et al. | 380/28 |
| 6,613,661 B1 | 9/2003 | Baukus et al. | 438/598 |
| 6,715,010 B2 | 3/2004 | Kumata | 710/71 |
| 6,839,847 B1 | 1/2005 | Ohki et al. | 713/194 |
| 7,127,620 B2 | 10/2006 | Boeckeler | |
| 2001/0025344 A1 | 9/2001 | Teglia | 713/200 |
| 2002/0131596 A1 | 9/2002 | Boeckeler | 380/252 |
| 2002/0169968 A1 | 11/2002 | Gammel et al. | 713/189 |
| 2002/0169969 A1 | 11/2002 | Watanabe et al. | |
| 2003/0005321 A1 | 1/2003 | Fujioka et al. | 713/193 |
| 2003/0044003 A1 * | 3/2003 | Chari et al. | 380/28 |
| 2003/0110390 A1 * | 6/2003 | May | 713/194 |
| 2003/0118190 A1 | 6/2003 | Sedlak et al. | 380/277 |
| 2004/0039928 A1 | 2/2004 | Elbe et al. | |
| 2004/0088488 A1 | 5/2004 | Ober et al. | |
| 2005/0169462 A1 | 8/2005 | Jung et al. | |
| 2005/0193045 A1 * | 9/2005 | Yamamoto et al. | 708/250 |
| 2005/0232430 A1 | 10/2005 | Gebotys | |
| 2005/0273630 A1 | 12/2005 | Shu et al. | 713/189 |

FOREIGN PATENT DOCUMENTS
DE 199 36 939 A1 4/2000
(Continued)

OTHER PUBLICATIONS
U.S. Appl. No. 10/864,556, filed Jun. 8, 2004, Shu et al.
(Continued)

*Primary Examiner* — Beemnet Dada
*Assistant Examiner* — Yogesh Paliwal
(74) *Attorney, Agent, or Firm* — Ladas & Parry

(57) ABSTRACT

An apparatus and method for preventing information leakage attacks that utilize timeline alignment. The apparatus and method inserts a random number of instructions into an encryption algorithm such that the leaked information can not be aligned in time to allow an attacker to break the encryption.

34 Claims, 5 Drawing Sheets

FOREIGN PATENT DOCUMENTS

| | | |
|---|---|---|
| DE | 19845073 | 4/2000 |
| EP | 1 006 492 A1 | 6/2000 |
| EP | 1006492 A1 * | 6/2000 |
| EP | 1 098 469 | 5/2001 |
| EP | 11191149(A) | 4/2011 |
| FR | 2 862 150 | 5/2005 |
| JP | 11-191149 | 7/1999 |
| WO | 01/90854 | 11/2001 |
| WO | WO 0190854 A1 * | 11/2001 |
| WO | 2004/053662 A2 | 6/2004 |

OTHER PUBLICATIONS

U.S. Appl. No. 10/864,568, filed Jun. 8, 2004, Shu et al.

Aigner, M., et al., "Power Analysis Tutorial," *Institute for Applied Information Processing and Communication*, University of Technology, Graz, Austria, pp. 1-15.

"American National Standard Data Encryption Algorithm," *American National Standards Institute, Inc.*, ANSI X3.92/1981, pp. 9-16 (1981).

Kocher, P., et al., "Differential Power Analysis," *Cryptography Research of San Francisco*, California, pp. 1-10 (1998).

Kocher, P., et al., "Introduction to Differential Power and Related Attacks," *Cryptography Research, Inc.*, Internet: <http://www.cryptography.com/resources/whitepapers/DPA-technical.html> pp. 1-5 (1998).

Messerges, T.S., "Investigations of Power Analysis Attacks on Smartcards," *Proceedings of USENIX Workshop on Smartcard Technology*, pp. 151-161 (May 1999).

Hohlmann, H.D.L., et al. "Protection of software algorithms executed on secure modules", *Future Generations Computer Systems*, vol. 13, No. 1, pp. 55-63 (Jul. 1997).

\* cited by examiner

CRYPTOGRAPHIC ARCHITECTURE WITH RANDOM INSTRUCTION MASKING TO THWART DIFFERENTIAL POWER ANALYSIS

CROSS REFERENCE TO RELATED APPLICATIONS

This application is related to U.S. patent application Ser. Nos. 10/864,556 and 10/864,568 filed on the same date as this application and entitled "Cryptographic Bus Architecture for the Prevention of Differential Power Analysis" and "Cryptographic CPU Architecture with Random Instruction Masking to Thwart Differential Power Analysis" the disclosures of which are hereby incorporated by reference.

BACKGROUND OF THE INVENTION

1. Field of the Invention

The present invention relates to the security of cryptographic methods and the cryptographic architecture of a processor used in microelectronic assemblies, such as Smart Cards and the like, in order to prevent security breaches of the same when a Differential Power Analysis (DPA) attack is utilized.

2. Description of Related Art

Cryptographic techniques are well-known in the art. Indeed, they date from at least the time of Caesar when the need to keep certain information secret from prying eyes became important enough for people to find ways to disguise the information by means of codes and ciphers.

Today, cryptographic techniques are in a wide array of applications, both governmental and private. One application of cryptographic techniques is to protect information stored in a Smart Card and/or to protect the capabilities of the Smart Card from unauthorized use or modifications. Cryptographic devices, such as Smart Cards, use secret keys to process input information and/or to produce output information. It has been assumed that the information stored in a cryptographic device, such as a Smart Card, is relatively safe from attack provided that an especially strong cryptographic technique is utilized.

Modern cryptography utilizes transposition and substitution of digital data. Messages to be encrypted, known as plaintext, are transformed by a function that is parameterized by a key. The output of the encryption process, known as the ciphertext, is then transmitted. The received ciphertext is then decrypted, using a key, back into plaintext.

One example where modern cryptography is used is in pay-TV conditional-access systems such as pay channels for cable and satellite television. Smart cards and/or security processors (containing secret keys) are used to decrypt the television signals. Attackers buy a cable or satellite receiver and then attack the smart card or security processor inside in order to determine the secret keys. The cipher text is the information sent from the cable or satellite provider, and the plaintext is the decrypted television signal sent to the television. Thus, it is generally assumed that the input and output information, i.e. the plaintext and ciphertext, is available to attackers, and information about the secret keys is unavailable. FIG. 1 depicts a cryptographic system. An attacker may attack the smart card or security processor by looking for information related to the secret keys that may be leaked via EM radiation, power consumption, timing etc. The leaked information, commonly referred to as side channel information, can then be used by attackers in order to determine the secret key used. One common technique for determining a secret key from leaked or side channel information is known as Differential Power Analysis (DPA). Unfortunately, there is no way to guarantee that power consumption, EM radiation, etc. will not leak certain cryptographic process information being performed by a device and thus obtain information about the secret keys. Therefore, defensive techniques are needed that produce leaked information that is unusable by hackers using correlation techniques such as DPA.

DPA has been utilized successfully within the past several years to determine the secret keys used in cryptographic devices such as Smart Cards, where in particular the digital encryption standard (DES) is used. See, for example, *Differential Power Analysis* published by Paul Coker, et al., Cryptographic Research of San Francisco, Calif. A tutorial on DPA is also provided in the article, *Power Analysis Tutorial*, published by Manfred Aigner, et al., of the Institute for Applied Information Processing and Communication, University of Technology, Graz, Austria. As described in these references, in order to utilize the DPA technique, the attacker monitors the power consumption of the cryptographic device. The fluctuations in the power used by the device reflect the operations going on within the device and that, in turn, can be used to glean information about the secret keys stored within the device.

It is emphasized, however, that side channel information other than power consumption information may be studied by DPA to extract encryption keys. Some examples are electromagnetic (EM) radiation and faulty outputs. Unfortunately, there is no way to guarantee that power consumption, EM radiation, and the like, will not leak certain information, and it is believed that it is impractical to expect cryptographic devices, such as Smart Cards, to be completely leak-free in terms of information being able to be discerned by their power consumption, EM radiation or the like. However, defensive techniques can be used that make whatever information is leaked uncorrelatable, even if sophisticated statistical approaches are used, for example, in the DPA process. As such, the present invention is concerned with a solution to the problem of making power consumption information uncorrelatable to the secret keys stored within a cryptographic device, such as a Smart Card.

In the prior art, certain decorrelation techniques do exist. See, for example, U.S. Pat. Nos. 6,295,606 and 6,298,153 to Messerges, et al., and published European Patent Application Number 1,098,469 of Boeckeler.

The decorrelation techniques discussed in published European Patent Application Number 1,098,469 by Gregor Boeckeler, superimpose a random current profile based on a secondary clock CLK2, inserted upon the existing profile of a CPU which is based on a master clock CLK1. Each clock is randomly adjusted in a range between 3-7 MHz. Due to two clocks differing from one another with respect to their center frequencies, the combined current profile is randomized which makes a DPA attacker's job more difficult.

Thomas Messerges, in U.S. Pat. No. 6,208,135, uses a randomized starting point in the set of target bits. Mr. Messerges processes the corresponding target bits in a different order; thus it becomes difficult for a DPA attacker to group related target bits from all the plaintexts of interest in order to perform statistical analyses associated with given target bit positions. However, not only does this approach not conceal the information leaked by a data bus; it also cannot prevent a malicious attacker from using this information to reorder the target bit into the correct bit position.

Mr. Messerges also developed another technique, as discussed in U.S. Pat. No. 6,295,606, that uses a random mask to keep the message and key hidden both while they are stored in memory, and during processing by the cryptographic algorithm itself. However, since the mask is randomly changed, new S-boxes must be updated accordingly, and this takes time. The disadvantage is that this kind of masking operation slows down the DES algorithm by a factor of three to five. In addition, this kind of masking operation cannot prevent an attacker from gathering a 48-bit partial key from Round Sixteen when the results must be eventually unmasked to provide the correct output of the cipher. Thus Messerges' approach becomes vulnerable to DPA after unmasking. With 48 bits now known at Round Sixteen, the remaining six key bits to make 56 can then be exhaustively searched by an attacker. The present approach is computationally faster, and it also can prevent an attacker from gathering the partial key from Round Sixteen of the DES algorithm.

These prior art approaches have certain limitations and therefore need improvement. This invention proposes a unique Random Instruction Mask (RIM) as a countermeasure to the DPA process, effectively making power consumption uncorrelatable to cipher bit values. The present invention has the following advantages over the techniques of Messerges, Boeckler and others:

(1) More Efficient Calculations: The techniques taught by Messerges et al. slow down the DES algorithm by 300 to 500% due to the regular update of the S-boxes. In the present invention, the DES algorithm will be slowed down by approximately 15%.

(2) More Robust: Even in the presence of leaked information for multiple address locations.

(3) Better Protection: 48-bits of a key can be completely concealed in the last DES round, (in DES the output is unmasked at the end of the algorithm thereby exposing the key, which is not solved by the prior art), and (4) Low Power Consumption: There is an increase in power consumption by less than 1% compared to Boeckeler's random current profiling, which increases power consumption to about 200% during cryptographic operations.

Before discussing the details of the preferred embodiments disclosed herein, additional details related to the DES algorithm and DPA attacks will be provided. If the reader is new to this area, further information may be found in our related U.S. patent application Ser. No. 10/864,556 for an intuitive description of how a DPA attack works and in the following articles, P. Kocher, J. Jaffe, and B. Jun, "Introduction to Differential Power Analysis and Related Attacks," 1998, Thomas S. Messergers, Ezzy A. Dabbish, and Robert H. Sloan, "Investigations of Power Analysis Attacks on Smartcards", in *Proceedings of USENIX Workshop on Smartcard Technology*, Chicago, Ill., May 1999, pp. 151-161, and Manfred Aigner and Elisabeth Oswald, "Power Analysis Tutorial" Institute for Applied Information Processing and Communication University of Technology Graz, Austria. The following discussion is offered to provide a context for a detailed explanation of the present invention.

The DES algorithm is an example of an iterative-block cipher. DES is described in detail in ANSI X.392, "American National Standard for Data Encryption Algorithm (DEA)," American Standards institute, 1981, which is incorporated by reference herein. The DES cipher is well known and utilizes a number, typically sixteen, of substitution-permutation box (SP-Box) functions instituted in program sequences called rounds. The SP box functions are non-linear and are conventionally implemented using lookup tables or Boolean logic gates or appropriately programmed computers. In each of the sixteen rounds, the DES encryption algorithm performs eight SP box operations, in turn, by accessing sequentially each lookup table (or by using equivalent logic gates). The eight SP boxes each take, as input, a scrambled 6-bit key, (here, scrambled means that the key has been XOR-ed and shifted) and produce a 4-bit output target to be accessed by the CPU for OR-ing operations. Each such 6-bit scrambled key is an SP box's entry address. Table 1 shows the C-language representation of SP boxes 1 and 2 in a 32-bit implementation of DES. DES can run with 16, 32, and 64 bits but we have chosen the 32-bit representation as a nominal example. From Table 1 note that each SP lookup contains 64 elements. Each element in a nominal DES implementation is 32-bits and embeds a given 4-bit output target. This embedding will now be described in greater detail.

The data bus is 32-bits wide, this 4-bit output target is distributed somewhere within a 32-bit word according to the permutation rules (one per SP box) as implied in Table 1, where the data is presented in a hexadecimal format. That is, each SP lookup table will have a different embedding position for a given 4-bit output target. For example, lookup table SP1, shown in Table 1, embeds a 4-bit output target at bit positions 24, 16, 10 and 2 in a 32-bit word. Lookup table SP2 embeds a 4-bit output target at bit positions 20, 5, 31 and 15, where bit 20 is the most significant bit (MSB) and bit 15 is the least significant bit (LSB) for a given 4-bit output. As a further illustration, the first four entries of lookup table SP1, i.e., SP1 [0:3]={0x01010400L, 0x00000000L, 0x00010000L, 0x01010404L} have 4-bit output target values of 14, 0, 4, 15. Specifically, SP1[0]={0x010400L} is embedded with a 4-bit output target value of 14 (i.e, 1110). For example, for SP1[0] the 32 bit binary word is 0000 0001 0000 0001 0000 0100 0000 0000. The right most digit is the LSB while the left most digit is the MSB for a given 32-bit binary word. To derive the 4-bit output target, the values of the bits at 24, 16, 10, and 2 are used. For example, for SP1 [0] the 4-bit output target is 1110. This is determined by looking for the MSB value of the 4-bit output target at position 24, the next bit is at position 16, the third bit is at position 10, and finally the LSB of 0 is at position 2 of the 32 bit binary word SP1 [0]. The bit positions, 24, 16, 10 and 0 are underlined in the binary representation given above. The fourth entry SP1[3]={0x01010404L}, (which differs from the 1110 of SP1 [0] only at the LSB), has a 4-bit output target value of 15 (i.e., 1111).

On the other hand, the lookup table SP2 illustrates different embedding bit position scheme as shown in the first four entries of lookup table SP2, i.e., SP2[0:3]={0x80108020L, 0x80008000L, 0x000080000L, 0x00108020L.} Only the contents at bit positions 20, 5, 31 and 15 are changed to reflect the values of 15, 3, 1, 13 for the corresponding 4-bit blocks. In particular, the first entry of lookup table SP2, SP2[0]= {0x80108020L} has a 4-bit output target value of 15 (i.e., 1111) because bit 20, 5, 31 and 15 all have a value of 1. The fourth entry SP2[3]={0x00108020L}, (which differs with 1111 of SP2[0] only at the 2nd LSB), has a 4-bit target value of 13 (i.e., 1101).

Having established the relationship between the 4-bit output target and its corresponding SP box's entry, next the calculation of a given SP box's entry address is discussed. In general, a DES algorithm uses shifting instructions running in the CPU to calculate a box's entry address. Both the number of shifting instructions used in a specific SP box's entry address calculation and the time interval between each consecutive access of an SP box will be well known to anyone who is familiar with the DES algorithm. In view of this fact, DPA attacks are focused on aligning the power traces of each 4-bit output target of an SP box by referencing the preceding shifting instruction signature unique to that box. As shown in Table 2, under conventional operation, the accessing of each SP box is preceded by a different amount of shifts: >>8, >>16 or >>24 ('>>' stands for a right shift in the C computer language and thus '>>n' stands for a right shift of n bits). One skilled in the art will recognize that the routine in Table 2 is written in the C computer language. FIG. 2a shows a corresponding time line with normal accessing order for eight SP boxes [SP1 ... SP8].

In order to align the power traces, a DPA attacker looks for patterns in the power trace. To determine a SP address calculation for SP box 5 (SP5), the DPA attacker looks for a pattern indicating eight shifts as seen in Table 2. In addition, the DPA attacker would know that the time from the beginning of the eight shifts to the beginning of a next set of shifts is equal to a time $TI_5$ as shown in FIG. 2a. Thus, the DPA attacker, when finding this pattern in a power trace, would know that the SP address calculation for SP5 has been found. In addition, the attacker would also know that the information in the power trace for the time slot following the end of the eight shifts would contain the corresponding 4-bit output target information. This information allows for the alignment of the power traces for statistical averaging which provides information regarding the 6-bit key. One skilled in the art will appreciate that power traces are noisy, thus finding instruction signatures and other patterns may not guarantee the success of a DPA attack. However, the instruction signatures and other patterns are available in the prior art for an attacker to use. By destroying these instruction signatures and time patterns, the success of a DPA attack is even more unlikely.

FIG. 2b shows the time line with randomized accessing order for the eight SP boxes. As an illustration in FIG. 2b, the processing order of SP1 and SP3 has been swapped, and similarly for the SP4 and SP6. In this case, it is obvious that a DPA attacker will have to identify these shifting instruction signatures in order to align power traces by re-shuffling the SP box accessing order. After alignment for a given SP box, statistical averaging and other analysis of these power traces can be performed. Thus, the DPA attacker can ultimately align the power traces to determine the 6-bit key.

SUMMARY OF THE DISCLOSED TECHNOLOGY

In one aspect the present invention provides a method of inhibiting a successful DPA of a cryptographic device comprising: randomly varying an amount of time required to determine at least one lookup table address; and randomly varying an amount of time occurring between one access of at least one lookup table and a subsequent access of another lookup table.

In another aspect, the present invention provides a cryptographic architecture comprising: a processor; a memory module containing an encryption algorithm coupled to said processor; a control flag register coupled to said processor for controlling the state operation of the processor; and a random number generator coupled to said control flag register, wherein said processor sets said control flag register and said random number generator resets said control flag register.

In yet another aspect, the present invention provides a system for thwarting DPA, said system comprising: means for running an encryption algorithm and means for inserting a random number of pseudo instructions into said encryption algorithm.

In still another aspect, the present invention provides a system for decorrelating side channel information, said system comprising: means for running a Data Encryption Standard (DES) algorithm, said DES algorithm comprising a plurality of substitution/permutation box entry address evaluations and means for inserting a random number of shifting instructions run in each of said plurality of substitution/permutation box entry address evaluations.

In yet another aspect, the present invention provides a method of altering a power trace of a cryptographic architecture comprising the steps of: running an encryption algorithm; setting a control flag; and performing a random number of instructions when said control flag is set.

DETAILED DESCRIPTION OF THE TABLES

Table 1 shows values, expressed in the C language, for SP-boxes 1 and 2 implemented as lookup tables of 64 elements.

Table 2 is a C language program that sequentially accesses DES's eight SP lookup tables for a given round.

Figure 1:
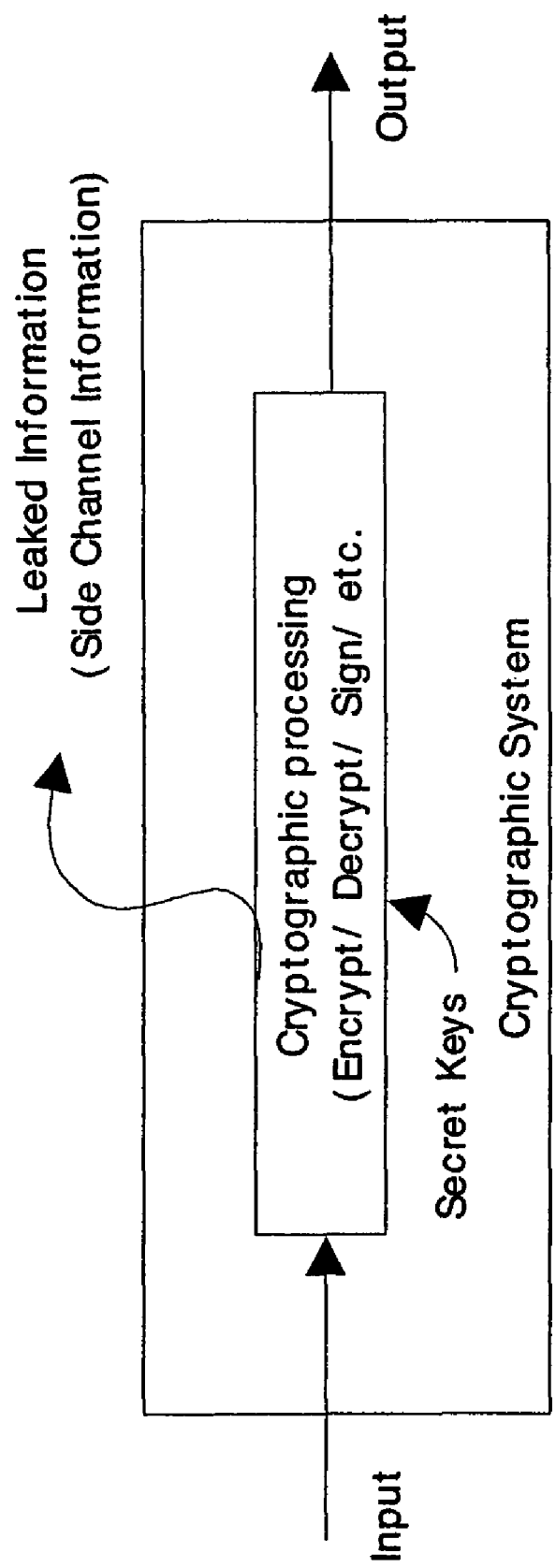
FIG. 1 depicts a prior art diagram of information available to attackers.
Figure 2A:
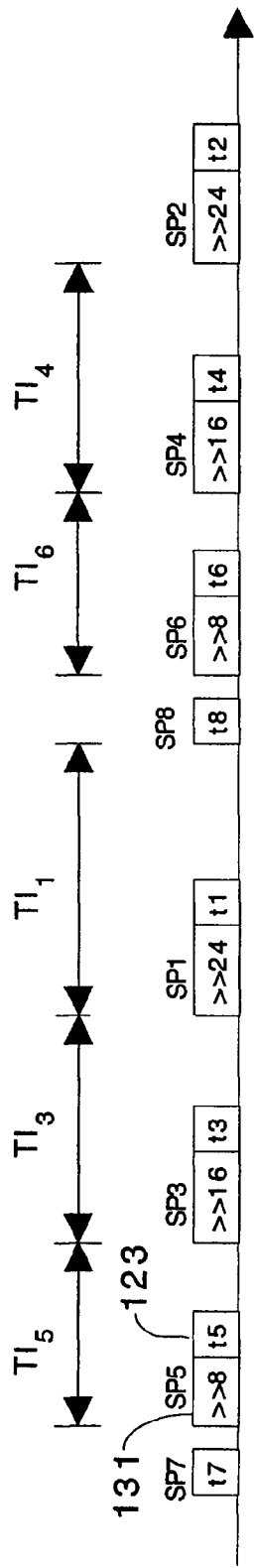
FIG. 2a is a prior art timeline corresponding to the normal accesses of eight SP lookup tables for a given round.

Table 3 is an assembly language program to implement C program statement no. 5 of FIG. 2a.

Table 4 is an Assembly language program of a 16-bit CPU to implement a portion of the DES encryption algorithm that performs eight S and P boxes' operations in turn by accessing sequentially each lookup table.

DETAILED DESCRIPTION

The present invention now will be described more fully hereinafter with reference to the accompanying drawings, in which preferred embodiments of the invention are shown. This invention may be embodied in many different forms and should not be construed as limited to the embodiments set forth herein.

The following discussion provides one context for using the present invention in connection with a well-known cipher, the data encryption standard (DES), and thwarting DPA analysis that is commonly used to break DES. Those skilled in the art should appreciate that this discussion is for illustrative purposes only, and that the present invention may be utilized to protect secret keys of a number of data encryption formats from a number of hacking techniques in which side channel information is used in order to determine the secret keys.

In general, any encryption algorithm is a series of instructions executed by a processor. While the inputs and outputs of these instructions will vary, the amount of time required to complete each instruction is determined by the clock speed of the processor or a bus over which the data is transmitted to and from the processor. Different instructions take more clock cycles than other instructions. The knowledge of the encryption algorithm used to encrypt/decrypt the data provides hackers with knowledge about the timing of the algorithm, i.e. knowledge about which instructions are used and thus how long each instruction should take. This knowledge about timing can then be used to align side channel information. Thus, the side channel information can then be processed by sophisticated statistical approaches that allow the attacker to break the encryption.

A system and method for randomizing the number of instructions within the encryption algorithm is disclosed herein. By randomizing the number of instructions and by their execution thereby inserting random delay times, the instructions and timing within the encryption algorithm are no longer known to the DPA attacker. Therefore, the timing of the algorithm will be unknown to the attackers and they will be unable to align the side channel information. Without the alignment of the side channel information, the sophisticated statistical approaches will fail and the encrypted information will be protected.

The following discussion illustrates how the present invention may be incorporated with a system using DES to prevent an attack via DPA. One skilled in the art will appreciate that the present invention may be incorporated into other systems which use other encryption algorithms in order to randomize the time between given instructions. This randomization of time may be used to defeat any attack that relies upon understanding the timing of the algorithm in order to break the encryption.

This specification provides information specific to an on-chip Random Instruction Masking (RIM) architecture on a microprocessor that is used to perform cryptographic operations. Furthermore, this specification provides an architectural approach for securing existing cryptographic algorithms (including RSA, DES, AES and non-linear algorithms) from Side-Channel-Attacks—i.e., attacks based on leaked power information. The motivation is to keep systems secure even though the underlying circuits will very likely always be leaking such information.

A software approach to randomizing the order of the processing of the target bit is not enough to secure an algorithm completely. It is also necessary to destroy all instruction signatures or power patterns that may allow the DPA attackers to reorder the target bits to their original sequences. Consequently, one approach is to complement a software approach with hardware protection by means of an architecture that implements the randomizing instructions and time delays as disclosed herein.

An embodiment of an architectural (hardware) approach to prevent DPA attacks from extracting information correlated to secret keys to the DES or other cryptographic algorithm will now be described. Limited background information regarding DES is provided above. If the reader is new to this field, please refer first to our related U.S. patent application Ser. No. 10/864,556 for an intuitive description of how a DPA attack works and to references P. Kocher, J. Jaffe, and B. Jun, "Introduction to Differential Power Analysis and Related Attacks," 1998; Thomas S. Messergers, Ezzy A. Dabbish, and Robert H. Sloan, "Investigations of Power Analysis Attacks on Smartcards", in *Proceedings of USENIX Workshop on Smartcard Technology*, Chicago, Ill., May 1999, pp. 151-161; and Manfred Aigner and Elisabeth Oswald, "Power Analysis Tutorial" Institute for Applied Information Processing and Communication University of Technology Graz, Austria for a more rigorous discussion. In addition, the following illustration is dependent upon a thorough knowledge of the DES algorithm. Comparable detailed knowledge of the appropriate algorithm would be required to attempt an attack on one of the other algorithms. The present discussion starts by discussing the defensive RIM techniques for preventing DPA and related attacks. It is assumed that a DPA selection function can simultaneously select for values of four target bits rather than just one bit because low-level instructions often manipulate four bits (due to common use of six key bits.) The resulting DPA characteristics tend to have larger peaks, but do not have better signal-to-noise ratios because proportionately fewer samples are included in the averaging.

Figure 3:
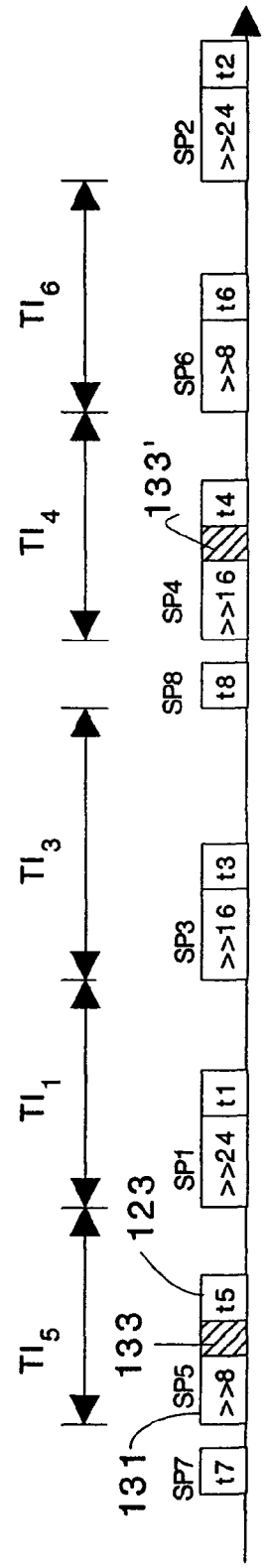
FIG. 3 is a time line with both the time intervals and SP boxes accessing orders being randomized by Random Instruction Masking (RIM) in accordance with the present invention.

FIG. 3 depicts how the time line relationship between SP box's entry address calculation 131 and the generation of a given 4-bit output target 123 may be modified. The modification comprises the insertion of random numbers of pseudo shifting instructions 133 (according to a first embodiment) or random numbers of randomized pseudo instructions in each SP box's entry address calculation subroutine. It is important that the random pseudo shift instructions include the shift and that they exactly mimic the power signature of the real instructions. Unless these pseudo instructions include a shift, their effect could be observed and thus ignored by a DPA hacker. There is a fixed relationship between the number of shifts and the SP box index and as long as the attacker can identify that number of shifts somewhere, then he can identify the SP box being addressed. He can do this via statistical reordering of the data to find the correct number of shifts. In addition to DES, most encryption algorithms do utilize shift instructions somewhere, and assuming that the algorithm is known by the DPA attacker, then a similar correlation can be found unless the disclosed technique of inserting random numbers of shift instructions is utilized.

Figure 2B:
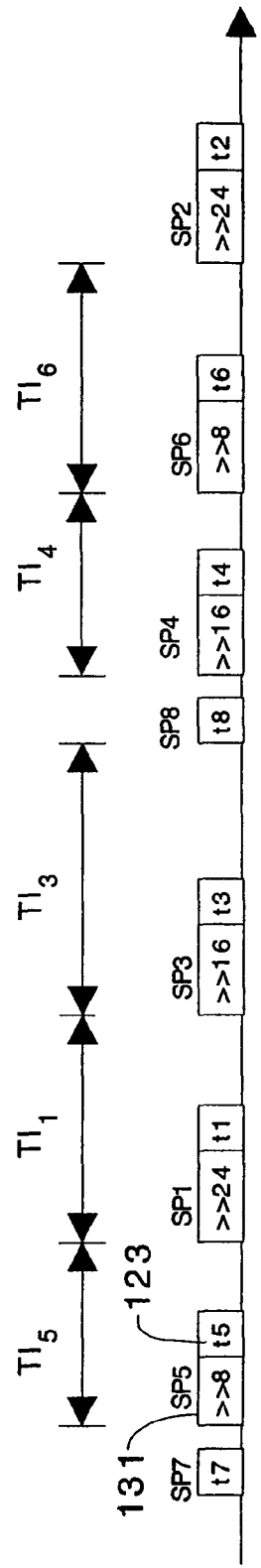
FIG. 2b is a prior art timeline corresponding to a randomized accessing order of the eight SP lookup tables for a given round.

As shown in FIG. 3, the insertion of the pseudo shifting instructions 133 or other pseudo instructions 133 changes not only the number of instructions run in each SP box's entry address evaluation, but also the time interval between consecutive SP box access $T_n$. In the example shown in FIG. 3, a random number of pseudo shifting instructions 133 have been inserted in SP5, thus changing the time interval $T_5$ between the access of SP5 and SP1 compared to FIG. 2b. Further, a random number of pseudo instructions 133 are inserted in SP4, thus changing the time interval $T_4$ between the access of SP4 and SP6 compared to FIG. 2b. Of course, a random number of pseudo shifting instructions 133 could also be inserted in one or more of the other SP boxes. The instructions are called 'pseudo' since they preferably mimic the power consumption trace of a real counterpart instruction (and, indeed, in certain embodiments, they may in fact be real instructions), but the execution of the pseudo instruction does not result in any data being updated by the processor.

Due to the insertion of a random number of pseudo instructions 133 that mimic the real shift instruction from a power use point of view, both the Shifting Instruction signatures and the time interval signatures are eliminated (camouflaged). This will cause a DPA attacker to be unable to identify which SP box SP1-SP8 is being accessed in the program. This will make the re-shifting of the SP box access order an effective way of hiding information from DPA attackers; therefore, they can no longer align different power traces to the same reference for statistical averaging and analysis. If the pseudo instructions exactly mimic real shift instructions from a power use point of view, then the attacker can find it very difficult to identify which SP box is which. If the pseudo instructions mimic a set of randomized instructions, then the SP boxes may well be very difficult to recognize at all. The attacker may well wonder whether the encryption protocol used by the device is the same protocol that the attacker assumes the attacked device utilizes.

Figure 4:
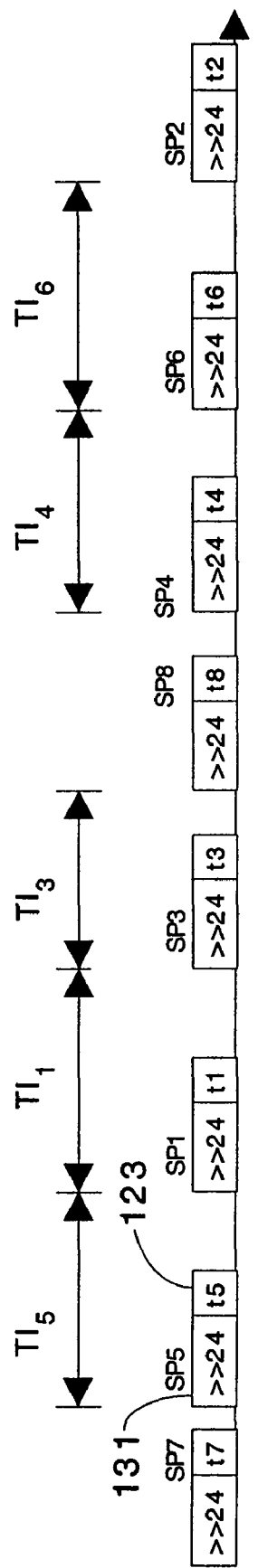
FIG. 4 is a time line with the shifting instructions being equalized in accordance with the present invention.

Instead of randomizing the number of shift instructions run in each (or some) SP box's entry address evaluation, it is possible to equalize the number of shift instructions, such that there appears to be a shift of 24 before each output, as shown in FIG. 4. However, it is preferable to randomize the number of instructions, which also randomizes the time interval between each consecutive SP box access. Thus, the randomization thwarts an attacker's use of the time interval as a signature to identify the SP box access. This added uncertainty further complicates the attacker's task. However, as can be seen with reference to FIG. 4, randomization is not critical to the present invention.

Figure 5:
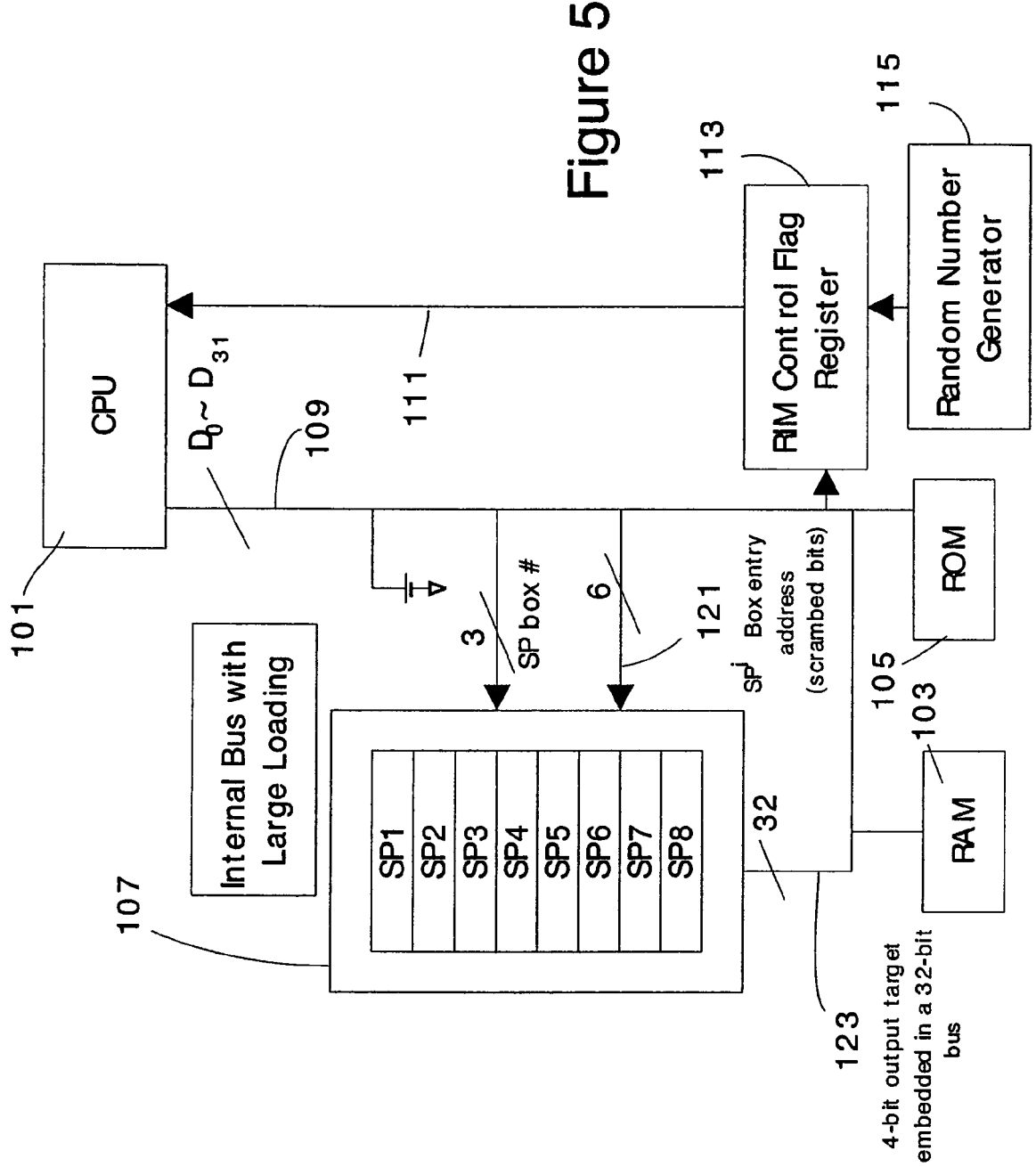
FIG. 5 is a block diagram of an embodiment of a hardware architecture for implementing the DES algorithm in accordance with the present invention.

FIG. 5 depicts a first embodiment of a hardware architecture for implementing the DES algorithm which may be used to insert a random number of pseudo shifting instructions 133 (as discussed with reference to FIG. 3) or an equalized number of shifting instructions 133 (as discussed with reference to FIG. 4). The system illustrated in FIG. 5 includes a 32-bit processor or Central Processing Unit (CPU) 101 with RAM 103 and ROM 105 memories on a single chip. One skilled in the art will appreciate that the present invention may be implemented for other hardware architectures such as 2-bit or 8-bit architectures. Accordingly, the CPU could be a 16-bit or 64-bit processor, respectively.

The system also contains substitution/permutation boxes (SP1-SP8) 107, which can be implemented as lookup tables, as discussed above. The CPU 101 runs an encryption/decryption program stored in the ROM 105, while the RAM 103 is for intermediate storage of the cipher text data. The 6-bit key (or a guessed key) 121 and SP boxes 107 are used to calculate the Cipher Function $f$. A Random Number generator 115 is coupled to a Random Instruction Mask (RIM) control flag register 113 which is coupled to the CPU 101. In this embodiment, the random number generator 115 and the RIM control flag register 113 are used to camouflage the power trace so that this power trace cannot be time-aligned to yield statistical material for any given 6-bit key 121. Since an attacker is focused on aligning the power trace associated with each 4-bit output target 123 by tracking the shifting instruction signatures, the present RIM approach is devoted to disabling this tracking ability.

A random number of pseudo shifting instructions 133 are generated through the interaction of the CPU 101, the RIM Control Flag Register 113 and the Random Number Generator 115. The CPU 101 runs the encryption/decryption program stored in the ROM 105. Embedded in this encryption/decryption program (to be discussed later) is an instruction to set the RIM Control Flag Register 113. Upon processing this instruction, the CPU 101 sends a signal on bus 109 to the RIM Control Flag Register 113 that sets it. The RIM Control Flag Register 113 then sends a RIM Control Flag signal on a control line 111 to the CPU 101 causing the CPU 101 state machine to halt (to stop updating registers in response to calculations). This may be accomplished by sending a signal from the RIM Control Flag Register 113 to the program counter register within the CPU 101 that will disable the program counter. Effectively, the state machine of the CPU 101 is halted.

The state machine of the CPU 101 remains halted until the RIM Control Flag Register 113 is reset. This will cause the RIM Control Flag Register 113 to send a signal to the CPU 101 on control line 111 to enable the program counter in CPU 101. The RIM Control Flag Register 113 is preferably reset through the use of the Random Number Generator 115. For design simplicity, the Random Number Generator 115 is preferably a 1-bit random number generator. The Random Number Generator 115 is synchronized with the timing of the instruction cycle of the CPU 101. The Random Number Generator 115 may provide an output every clock cycle, or may be gated to ensure that an output is provided to the RIM Control Flag Register after a random number of X cycles, where X is any number such as 5. For a one-bit Random Number Generator 115, the RIM Control Flag Register 113 is programmed to reset when either a zero or one is received from the one-bit Random Number Generator 115 depending upon the logic used. For example, assume that a zero from the one-bit Random Number Generator 115 will reset the RIM Control Flag Register 113. Because the RIM Control Flag Register 113 is reset only after receiving a zero from the one-bit Random Number Generator 115, and the one-bit Random Number Generator 115 will generate a zero after a random number of cycles, the time the state machine of the CPU 101 is halted will also be random. Thus, a random number of pseudo instructions 133 is generated affecting the time line of the algorithm.

Preferably, a pseudo instruction 133 is an instruction producing the same power signature on power traces as the original instruction but the write back of the execution result to the destination register in the CPU 101 is inhibited since the state machine of CPU 101 is halted. The inhibiting of the CPU 101 preserves the CPU's state. Thus, inhibiting write back prevents the CPU from moving onto the next step in the algorithm; however, the power traces suggest otherwise. Thus, the attacker will be unable to use the power traces to decrypt the keys.

The CPU 101 in FIG. 5 is preferably modified to accommodate these pseudo instructions with a RIM control flag signal sent on the bus 111, generated by a RIM control flag register 113, which, when activated, will disable the update of the CPU 101 destination register or the CPU 101 program counter (details of the CPU modification are disclosed in U.S. patent application Ser. No. 10/864,568 filed on the same date as this application and entitled "Cryptographic CPU Architecture with Random Instruction Masking to Thwart Differential Power Analysis".

As a result of this RIM control flag signal on bus 111, all the instructions executed while the state machine of the CPU 101 is halted will have no material effect except to alter the power trace so that the number of discrete samples of a power trace is no longer fixed for a given 4-bit output target 123. While the RIM control flag Register 113 is set a random number of instructions will be executed. When the RIM control flag 111 is reset, the 4-bit output target 123 is supplied to the RAM 103. The introduction of RIM results in the random variation of not only the number of Shifting Instructions run in each SP box's entry address evaluation but also of the time interval between each consecutive SP box access $TI_n$. For further details regarding the random instructions executed while the RIM control flag is activated see U.S. patent application Ser. No. 10/864,568 filed on the same date as this application and entitled "Cryptographic Bus Architecture for the Prevention of Differential Power Analysis".

A description follows of how the insertion of pseudo shifting instructions works. As shown in Table 2, the DES C language statement #5 (i.e., fval=SP5[(work>>8) & 0x3fL]) contains an 8-bit right shifting instruction (i.e., "work >>8") as part of the entry address calculation to access the SP5 lookup table. Table 3 shows the expansion of this single C language statement into the corresponding Assembly language subroutine.

The Assembly statement #4 (i.e., jal link rshft) in Table 3 jumps and links to the subroutine labeled as "rshft" or Statement #13 (thus the mnemonic jal). The term "link" in this statement represents a register that contains the return address. When the program executes statement #13, i.e. the program counter pc←pc+1, the program counter stops advancing. The program counter tries to prefetch statement #14 but is halted until the RIM control flag is reset by the random number generator 1115. The "rshft" subroutine will right shift register 1 by 8 places as specified in the register C. To camouflage the power trace segment associated with the shifting instruction, RIM statements of variable block size (indicated between statement # 13 and #14) are inserted before (or after, or both) an actual shifting instruction statement like, #15 (i.e., sra 1 1). The instruction #13 in Table 3 allows the insertion of RIM instructions, when the RIM Control Flag Register 113 is set by the CPU 101 until the RIM Control Flag Register 113 is reset by the Random Number Generator 115. After execution of statement #15, and the completion of the RIM block, the "useful" execution of the program resumes.

The location of statements #13 and #14 in Table 3 are for illustrative purposes only. These statements can occur anywhere, before, between or after an actual shifting instruction statement like #15. Preferably, for design simplicity, statements #13 and #14 are located within the scope of the shifting routine. This random insertion thwarts a DPA attacker's attempt to track the shift instruction signatures because the number of discrete samples of a power trace is no longer fixed, but random. Hence, power traces cannot be time-aligned by the attacker for each 4-bit output target 123. In addition, this insertion of random instructions also changes the time interval, for example TI5, further thwarting the attempts of the DPA attacker. The random number of pseudo shift statements are preferably inserted in the middle of a loop—so the effect of them is magnified by the loop. If these statements were inserted outside the loop, then adding only one or two pseudo shifts really won't help: changing a >>8 to a >>10 may not camouflage it enough in the context of the DES algorithm. If you are trying to hide a >>8 from a >>16 or >>24, this requires that enough pseudo shift instructions be added to confuse the >>8 with a >>16 or a >>24. Putting the added random number of pseudo shift statements in the loop ensures that the added number of pseudo shift statements will be an integer multiple of 8. If a random number of pseudo shift statements is inserted outside the loop, then other techniques can be used to ensure that the added number of pseudo shift instructions will be 8, 16, 24 (or other number sufficiently close thereto to confuse the DPA attacker).

In terms of providing additional information, Table 4 is an assembly language program with a 16-bit CPU to implement the portion of the DES portion of the DES encryption algorithm that performs eight S and P boxes operations in turn by accessing sequentially each lookup table 107 as shown in FIG. 5. Lines start with ";" are the comment lines. Underlined statements are the corresponding C language statements for comment purposes.

Figure 6:
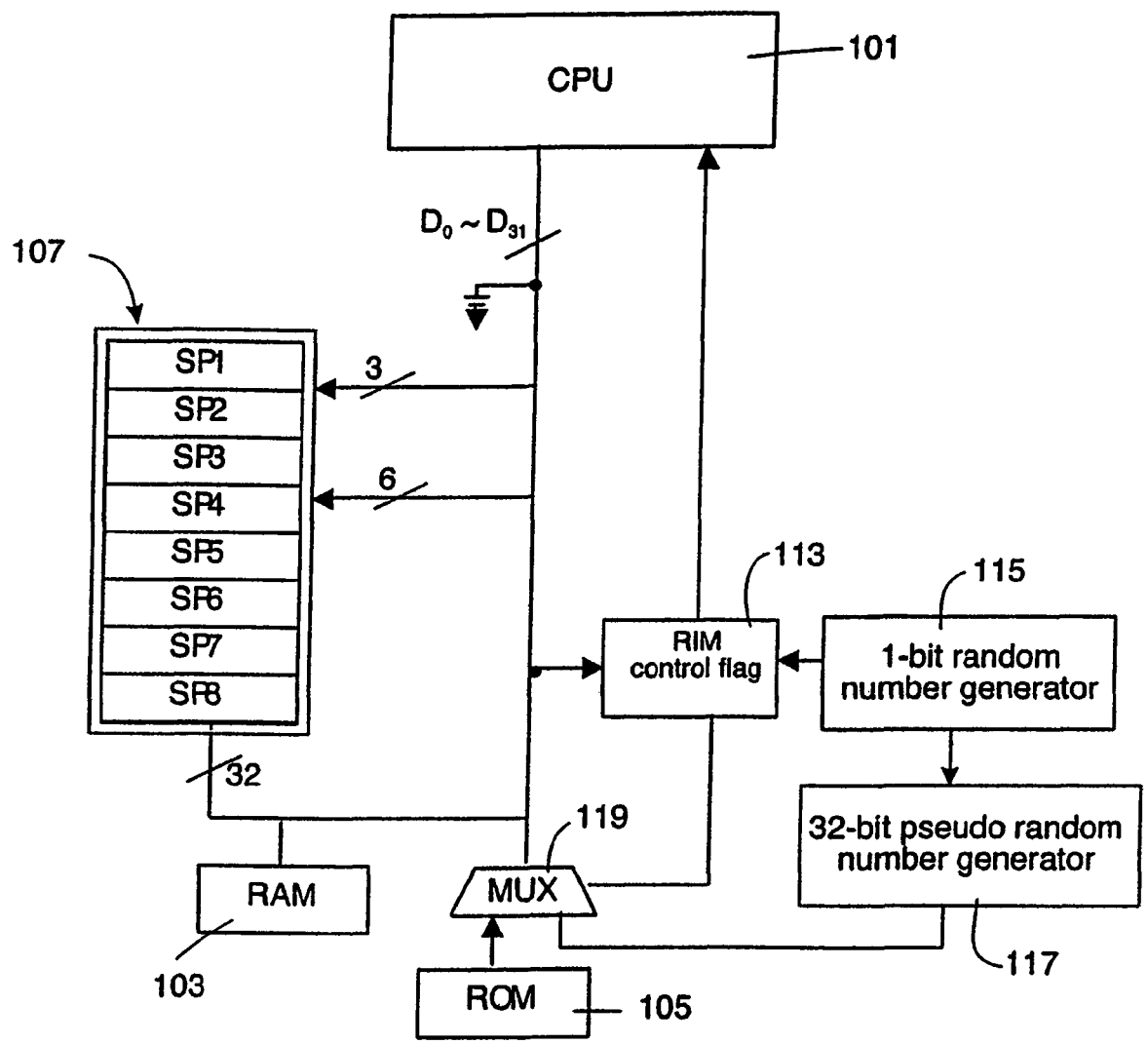
FIG. 6 is a block diagram of another embodiment of a hardware architecture for implementing the DES algorithm in accordance with the present invention.

FIG. 6 depicts another embodiment of a hardware architecture for implementing the DES algorithm which may be used to insert a random number of pseudo shifting instructions 133 of FIG. 3.

Since a DPA attacker is focused on aligning the power trace associated with each 4-bit output target by tracking the shifting instruction signatures, the first embodiment of FIG. 5 disables this tracking ability by inserting a random number of RIM instructions in each SP box's entry address calculation subroutine. In this embodiment, however, not only the number but also the content of these instructions will be altered, as described in detail below.

This embodiment, as shown in FIG. 6, is very similar to the embodiment of FIG. 5 and therefore common elements are identified by common reference numerals. As in the case of the embodiment of FIG. 5, this embodiment preferably has a 32-bit CPU 101 with RAM memories 103 and ROM memories 105 disposed on a single chip. This chip also preferably contains substitution/permutation boxes (SP1-SP8) 107, which can be implemented as lookup tables. The CPU 101 runs the program stored in the ROM 105, while the RAM 103 is for intermediate storage of the cipher text data. In this embodiment, the CPU 101 fetches not only the normal encryption program from the ROM 105, but also the camouflaged, randomized instructions by means of a 32-bit pseudo random number generator 117. As shown in FIG. 6, a MUX 119, selected by a RIM control flag register 113, determines the type of instructions fetched by the CPU 101, real instructions from ROM 105 or randomized instructions generated by the 32-bit pseudo random number generator 117.

As in the case of the prior embodiment, a conventional CPU is modified to include the RIM control flag register 113 which, when activated, will disable the update of the CPU's destination register(s). As a result of this flag being set, all the instructions executed inside the RIM statements block will camouflage the power trace so that the number of discrete samples of a power trace is no longer fixed for a given 4-bit output target. The number and type of these instructions are determined on the fly by the random number generators. The program address is also constantly being substituted for by another 32-bit pseudo Random number, since the Program Counter is not updated until the CPU resumes normal execution after the RIM control flag has been reset by the 1-bit random number generator. This RIM control line is made to be "probe-proof" because it is buried deeply in the poly layer and camouflaged; moreover, it requires infrequent change in RIM as long as it can thwart the tracking of the shifting instruction signatures.

In summary, the principle of DPA is to calculate and plot the difference of the sum of two groups of power traces. DPA can be effective if there is a statistical correlation between the difference between the sums of two groups of power traces and the content of a single target bit that exits the system at a specific time. Because of the introduction of our RIM embedded system, this statistical correlation is no longer valid due to the fact that target bits now exit the data path of the system at random rather than at specific times. The introduction of embedded RIM results in the random variation of two features. The first is a variation in the number/type of instructions run in each SP box's entry address evaluation. The second is a variation in the time interval between each consecutive SP box access. These two features will cause a DPA attacker to be unable to identify which SP box is being accessed in the program. This will, in turn make the re-shuffling of the SP box access order an effective way of hiding information from DPA attackers because they can no longer align different power traces to the same reference for statistical averaging and analysis.

Having described the invention in connection with different embodiments thereof, modification will now suggest itself to those skilled in the art. As such, the invention as defined in the appended claims is not to be limited to the disclosed embodiments except as specifically required by the appended claims.

TABLE 1

Expressed in C language, for example, SP-Box 1 & 2 are implemented as lookup tables of 64 elements
static unsigned long SP1 [64] =

{0x01010400L, 0x00000000L, 0x00010000L, 0x01010404L,
0x01010004L, 0x00010404L, 0x00000004L, 0x00010000L,
0x00000400L, 0x01010400L, 0x01010404L, 0x00000400L,
0x01000404L, 0x01010004L, 0x01000000L, 0x00000004L,
0x00000404L, 0x01000400L, 0x01000400L, 0x00010400L,
0x00010400L, 0x01010000L, 0x01010000L, 0x01000404L,
0x00010004L, 0x01000004L, 0x01000004L, 0x00010004L,
0x00000000L, 0x00000404L, 0x00010404L, 0x01000000L,
0x00010000L, 0x01010404L, 0x00000004L, 0x01010000L,
0x01010400L, 0x01000000L, 0x01000000L, 0x00000400L,
0x01010004L, 0x00010000L, 0x00010400L, 0x01000004L,
0x00000400L, 0x00000004L, 0x01000404L, 0x00010404L,
0x01010404L, 0x00010004L, 0x01010000L, 0x01000404L,
0x01000004L, 0x00000404L, 0x00010404L, 0x01010400L,
0x00000404L, 0x01000400L, 0x01000400L, 0x00000000L,
0x00010004L, 0x00010400L, 0x00000000L, 0x01010004L };
static unsigned long SP2[64]=
{0x80108020L, 0x80008000L, 0x00008000L, 0x00108020L,
0x00100000L, 0x00000020L, 0x80100020L, 0x80008020L,
0x80000020L, 0x80108020L, 0x80108000L, 0x80000000L,
0x80008000L, 0x00100000L, 0x00000020L, 0x80100020L,
0x00108000L, 0x00100020L, 0x80008020L, 0x00000000L,
0x80000000L, 0x00008000L, 0x00108020L, 0x80100000L,
0x00100020L, 0x80000020L, 0x00000000L, 0x00108000L,
0x00008020L, 0x80108000L, 0x80100000L, 0x00008020L,
0x00000000L, 0x00108020L, 0x80100020L, 0x00100000L,
0x80008020L, 0x80100000L, 0x80108000L, 0x00008000L,
0x80100000L, 0x80008000L, 0x00000020L, 0x80108020L,
0x00108020L, 0x00000020L, 0x00008000L, 0x80000000L,
0x00008020L, 0x80108000L, 0x00100000L, 0x80000020L,
0x00100020L, 0x80008020L, 0x80000020L, 0x00100020L,
0x00108000L, 0x00000000L, 0x80008000L, 0x00008020L,
0x80000000L, 0x80100020L, 0x80108020L, 0x00108000L };

TABLE 2

C language program that sequentially accesses DES's eight SP lookup tables for a given round.

| | |
|---|---|
| 1. | { |
| 2. | work = (right << 28) | (right >> 4); |
| 3. | work ^= *keys++; |
| 4. | fval = SP7[ work & 0x3fL]; |
| 5. | fval |= SP5 [(work >> 8) & 0x3fL]; |
| 6. | fval |= SP3 [(work >> 16) & 0x3fL]; |
| 7. | fval |= SP1 [(work >> 24) & 0x3fL]; |
| 8. | work = right ^ *keys++; |
| 9. | fval |= SP8[ work & 0x3fL]; |
| 10. | fval |= SP6[(work >> 8) & 0x3fL]; |
| 11. | fval |= SP4[(work >> 16) & 0x3fL]; |
| 12. | fval |= SP2[(work >> 24) & 0x3fL]; |
| 13. | leftt ^= fval; |
| 14. | } |

TABLE 3

The corresponding Assembly language program to implement the C program statement #5 of Table 2 - lines start with ";" are the comment lines.

The C language statement fval |= SP5 [(work >> 8) & 0x3fL] becomes, in assembly language:
1. li       A 0x3f;           A = 0x3f
2. add      l work 0;         l = work
3. li       C 8;              C = 8; initialize shifting counter to 8
4. jal      link rshft;       jump to Subroutine to right shift register l by C (reg.) places;
            l = (work >> 8)
5. and      l l A;            l = (work >> 8) & 0x3fL
6. li       B SP5;            B = &SP5
7. add      B B l;            B = &SP5 [(work >> 8) & 0x3fL]
8. Lw       B B;              B = SP5[(work >> 8) & 0x3fL];
9. Lw       C fval;           C = fval
10. or      C C B;            fval = C |= SP5[(work >> 8) & 0x3fL];
11. sw      fval C;           fval = C
12. "rshft" is the routine to right shift register l by C (reg.) places with Random Instruction Masking (RIM) enabled
13. rshft sw   RIM_start;     I/O to start RIM by allowing insertion of random instructions with CPU
                              registers update disabled. (i.e., begin of RIM statements block)
    ...;                      random instruction from random number generator
    ...;                      random instruction from random number generator
14. sw      RIM_stop;         I/O to stop Random Instruction Masking by enabling update of registers;
                              (i.e., end of RIM statements block)
15. sra     l l;              register l is shifted right by one place
16. sub     C C const1;       C--; decrement count register by one
17. bnz     C rshft;          (C > 0) loop
18. jr      link;             return to caller

TABLE 4

| | | | |
|---|---|---|---|
| 1. | ; | | for( round = 0: round < 8; round++ ) { |
| 2. | ; | | works[0] = (rights[1] << 12) | ((rights[0] >> 4) & 0x0fff); |
| 3. | ; | | works[1] = (rights[0] << 12) | ((rights[1] >> 4) & 0x0fff); |
| 4. | li | round 0; | round = 0 |
| 5. | li | A edf; | A = edf |
| 6. | Lw | B A; | B = &edf |

TABLE 4-continued

| # | Op | Args | Comment |
|---|---|---|---|
| 7. | Lw | C B; | C = edf |
| 8. | li | A keys; | A = keys, .i.e. en0ks |
| 9. | add | A A C; | A = en0ks + edf |
| 10. | Lw | j A; | j = &keys // initialize the pointer to the key schedules |
| 11. | rndbk4 li | A desmsk; | A = desmsk |
| 12. | Lw | A A; | A = &desmsk[0] |
| 13. | li | B 4; | B = 4 |
| 14. | add | B B A; | B = &desmsk[4] |
| 15. | Lw | fval0 B; | fval0 = desmsk[4] = 0x0fff |
| 16. | li | A 0; | A = 0 |
| 17. | add | l right0 A; | l = right0 |
| 18. | li | C 4; | l = (rights[0] >> 4) |
| 19. | jal | lnk rshft; | |
| 20. | and | work0 l fval0; | work0 = (rights[0] >> 4) & 0x0fff |
| 21. | add | l right1 A; | l = right1 |
| 22. | li | C 12; | l = (rights[1] << 12) |
| 23. | jal | lnk rtls; | |
| 24. | or | work0 work0 l; | |
| 25. | add | l right1 A; | l = right1 |
| 26. | li | C 4; | l = (rights[1] >> 4) |
| 27. | jal | lnk rshft; | |
| 28. | and | work1 l fval0; | work1 = (rights[1] >> 4) & 0x0fff |
| 29. | add | l right0 A; | l = right0 |
| 30. | li | C 12; | l = (rights[0] << 12) |
| 31. | jal | lnk rtls; | |
| 32. | or | work1 work1 l; | |
| 33. | ; | | works[0] ^= *keys++; |
| 34. | ; | | works[1] ^= *keys++; |
| 35. | Lw | C j; | C = *keys++ |
| 36. | add | j j const1; | j++ |
| 37. | xor | work0 C work0; | works[0] ^= *keys++ |
| 38. | Lw | C j; | C = *keys++ |
| 39. | add | j j const1; | j++ |
| 40. | xor | work1 C work1; | works[1] ^= *keys++ |
| 41. | ; | | fvals[0] = SP7LL[ works[1] & 0x3fL]; |
| 42. | ; | | fvals[1] = SP7RR[ works[1] & 0x3fL]; |
| 43. | li | fval0 fval; | intialize variables address for &fvals[0] |
| 44. | Lw | fval0 fval0; | fval0 = &fvals[0] |
| 45. | li | A 0x3f; | A = 0x3f |
| 46. | and | l work1 A; | l = works[1] & 0x3fL |
| 47. | li | B SP7LL; | B = SP7LL |
| 48. | Lw | B B; | B = &SP7LL |
| 49. | add | B B l; | B = &SP7LL[ works[1] & 0x3fL]; |
| 50. | Lw | B B; | B = SP7LL[ works[1] & 0x3fL]; |
| 51. | sw | fval0 B; | fvals[0] = SP7LL[ works[1] & 0x3fL]; |
| 52. | li | B SP7RR; | B = SP7RR |
| 53. | Lw | B B; | B = &SP7RR |
| 54. | add | B B l; | B = &SP7RR[ works[1] & 0x3fL] |
| 55. | Lw | B B; | B = SP7RR[ works[1] & 0x3fL]; |
| 56. | add | l fval0 const1; | l = &fvals[1] |
| 57. | sw | l B; | fvals[1] = SP7RR[ works[1] & 0x3fL]; |
| 58. | ; | | fvals[0] |= SP5LL[ (works[1] >> 8) & 0x3fL]; |
| 59. | ; | | fvals[1] |= SP5RR[ (works[1] >> 8) & 0x3fL]; |
| 60. | li | l 0; | l = 0 |
| 61. | add | l work1 l; | l = works[1] |
| 62. | li | C 8; | l = (works[1] >> 8) |
| 63. | jal | lnk rshft; | |
| 64. | and | l l A; | l = (works[1] >> 8) & 0x3fL |
| 65. | li | B SP5LL; | B = SP5LL |
| 66. | Lw | B B; | B = &SP5LL |
| 67. | add | B B l; | B = &SP5LL[(works[1] >> 8) & 0x3fL] |
| 68. | Lw | B B; | B = SP5LL[(works[1] >> 8) & 0x3fL]; |
| 69. | Lw | C fval0; | C = fvals[0] |
| 70. | or | C C B; | fvals[0] |= SP5LL[(works[1] >> 8) & 0x3fL]; |
| 71. | sw | fval0 C; | fvals[0] = C |
| 72. | li | B SP5RR; | B = SP5RR |
| 73. | Lw | B B; | B = &SP5RR |
| 74. | add | B B l; | B = &SP5RR[(works[1] >> 8) & 0x3fL] |
| 75. | Lw | B B; | B = SP5RR[(works[1] >> 8) & 0x3fL]; |
| 76. | or | fval1 fval1 B; | fvals[1] |= SP5RR[(works[1] >> 8) & 0x3fL] |
| 77. | ; routine to left shift register l by C (reg.) places | | |
| 78. | rtls | sla l l; | |
| 79. | sub | C C const1; | C-- |
| 80. | bnz | C rtls; | (C > 0) loop |
| 81. | jr | lnk; | return to caller |
| 82. | ; routine to right shift register l by C (reg.) places | | |
| 83. | ; warning : need to convert arithmetic shift to unsigned right shift | | |
| 84. | ; used reg k as temporary var | | |
| 85. | rshft | Lw B const1; | B = sign bit to extract |
| 86. | and | B l B; | B contains the sign bit of l |

TABLE 4-continued

| 87. | sra   | 1 1;        |                |
|-----|-------|-------------|----------------|
| 88. | xor   | 1 1 B       |                |
| 89. | sub   | C C const1; | C--            |
| 90. | bnz   | C rshft1;   | (C > 0) loop   |
| 91. | jr    | lnk;        | return to caller |
| 92. | rshft1 | sra 1 1;   |                |
| 93. | sub   | C C const1; | C--            |
| 94. | bnz   | C rshft1;   | (C > 0) loop   |
| 95. | jr    | lnk;        | return to caller |

The invention claimed is:

1. A cryptographic architecture comprising: a processor; a memory module containing an encryption algorithm coupled to said processor; a control flag register coupled to said processor for controlling a state operation of the processor; and a random number generator coupled to said control flag register, wherein said processor sets said control flag register and said random number generator resets said control flag register.

2. The cryptographic architecture of claim 1 further comprising: a plurality of lookup tables coupled to said processor; and a lookup table address calculation subroutine within said encryption algorithm; wherein a set of random instructions is performed during said lookup table address calculation subroutine when said processor sets said control flag register until said random number generator resets said control flag register.

3. The cryptographic architecture of claim 2 wherein the set of random instructions contains a random number of random instructions.

4. The cryptographic architecture of claim 1 further comprising: a plurality of lookup tables coupled to said processor; a lookup table address calculation subroutine within said encryption algorithm; and wherein a set of pseudo instructions is performed during said lookup table address calculation subroutine when said processor sets said control flag register until said random number generator resets said control flag register, said set comprising a random number of pseudo instructions.

5. The cryptographic architecture of claim 1 wherein said random number generator is a one-bit random number generator.

6. The cryptographic architecture of claim 1 wherein said processor is a 16-bit, 32-bit or 64-bit processor.

7. The cryptographic architecture of claim 1 wherein said encryption algorithm is a Data Encryption Standard (DES) algorithm.

8. A system for thwarting differential power analysis, said system comprising:
means for running an encryption algorithm; and
means for inserting a random number of pseudo instructions into said encryption algorithm, the pseudo instructions emulating bit-wise shift instructions power consumption wise, said means for inserting a random number of pseudo instructions into said encryption algorithm being triggered by an instruction contained in said encryption algorithm and the number of random pseudo instructions inserted at any given time being controlled by a random number counter operating externally of said algorithm.

9. The system of claim 8 wherein said means for running an encryption algorithm comprises: a processor; and a memory module containing said encryption algorithm coupled to said processor.

10. The system of claim 9 wherein said processor is a 16-bit, 32-bit or 64-bit processor.

11. The system of claim 9 wherein said encryption algorithm is a Data Encryption Standard (DES) algorithm.

12. The system of claim 8 wherein said means for inserting comprises: a control flag register coupled to said processor; and a random number generator coupled to said control flag register.

13. The system of claim 12 wherein said random number generator is a one-bit random number generator.

14. A system for decorrelating side channel information, said system comprising: means for running a Data Encryption Standard (DES) algorithm, said DES algorithm comprising a plurality of substitution/permutation box entry address evaluations; and means for inserting a random number of shifting instructions run in at least one of said plurality of substitution/permutation box entry address evaluations.

15. The system of claim 14 wherein said means for running a DES algorithm comprises: a processor; and a memory module containing said DES algorithm coupled to said processor; and a plurality of lookup tables coupled to said processor, said plurality of substitution/permutation boxes being implemented in said plurality of lookup tables.

16. The system of claim 15 wherein said processor is a 16-bit, 32-bit or 64-bit processor.

17. The system of claim 14 wherein said means for inserting comprises: a control flag register coupled to said processor; and a random number generator coupled to said control flag register.

18. The system of claim 17 wherein said random number generator is a one-bit random number generator.

19. A system for decorrelating side channel information, said system comprising: means for running a Data Encryption Standard (DES) algorithm, said DES algorithm comprising a plurality of substitution/permutation box entry address evaluations; and means for inserting a random number of pseudo instructions in at least one of said plurality of substitution/permutation box entry address evaluations, wherein the pseudo instructions emulate bit-wise shift instructions power consumption wise.

20. The system of claim 19 wherein said means for running a DES algorithm comprises: a processor; and a memory module containing said DES algorithm coupled to said processor; and a plurality of lookup tables coupled to said processor, said plurality of substitution/permutation boxes being implemented in said plurality of lookup tables.

21. The system of claim 20 wherein said processor is a 16-bit, 32-bit or 64-bit processor.

22. The system of claim 20 wherein said random number generator is a one-bit random number generator.

23. The system of claim 20 further including a random number generator for generating said pseudo instructions.

24. The system of claim 19 wherein said means for inserting comprises: a control flag register coupled to said processor; and a random number generator coupled to said control flag register.

25. A method of altering a power trace of a cryptographic architecture comprising: running an encryption algorithm; setting a control flag by a control flag instruction in said algorithm; inhibiting assessing additional instructions of said algorithm and performing instead a random number of pseudo instructions when said control flag is set; and resetting said control flag when said random number of pseudo instructions have been performed, wherein the pseudo instructions emulate bit-wise shift instructions power consumption wise.

26. The method of claim 25 wherein the setting of said control flag further comprises halting a state machine of said processor running said encryption algorithm.

27. The method of claim 26 wherein the halting of the state machine further comprises disabling a destination register in said state machine.

28. The method of claim 25 further comprising modifying said encryption algorithm to shuffle an access order of a plurality of lookup tables.

29. The method of claim 25 wherein said encryption algorithm is a Date Encryption Standard (DES) algorithm.

30. The method of claim 25 further comprising resetting said control flag, wherein said step of resetting further comprises sending a signal from a random number generator to a control flag register.

31. A method of inhibiting a successful differential power analysis of a cryptographic device comprising:
randomly increasing an amount of time required to determine at least one lookup table address; and
randomly increasing an amount of time occurring between one access of said at least one lookup table and a subsequent access of another lookup table,
wherein the randomly increasing steps are performed by executing random numbers of pseudo shift instructions in a state machine during the time required to determine said at least one lookup table address.

32. The method of claim 31 wherein the step of randomly increasing an amount of time required to determine at least one lookup table address includes inserting a random number of extra program cycles when determining said at least one lookup table address.

33. The method of claim 31 wherein the randomly increasing steps are initiated in response to computer program instructions set forth in an encryption algorithm of said cryptographic device.

34. A method of inhibiting a successful differential power analysis of a cryptographic device comprising:
randomly increasing an amount of time required to determine at least one lookup table address; and
randomly increasing an amount of time occurring between one access of said at least one lookup table and a subsequent access of another lookup table,
wherein the pseudo instructions emulate bit-wise shift instructions power consumption wise.

\* \* \* \* \*